(12) United States Patent
Zhang et al.

(10) Patent No.: US 9,349,290 B2
(45) Date of Patent: May 24, 2016

(54) SELF-REPORTED TRACKING METHODS INCLUDING A TRIP PLAN WITH AN EXPECTED DURATION OR EXPECTED RETURN

(71) Applicants: General Motors, LLC, Detroit, MI (US); GM GLOBAL TECHNOLOGY OPERATIONS LLC, Detroit, MI (US)

(72) Inventors: Jing Zhang, Grosse Pointe Park, MI (US); James M. Kortge, Grosse Pointe Park, MI (US)

(73) Assignees: General Motors LLC, Detroit, MI (US); GM Global Technology Operations LLC, Detroit, MI (US)

( * ) Notice: Subject to any disclaimer, the term of this patent is extended or adjusted under 35 U.S.C. 154(b) by 16 days.

(21) Appl. No.: 14/336,837

(22) Filed: Jul. 21, 2014

(65) Prior Publication Data

US 2016/0019785 A1 Jan. 21, 2016

(51) Int. Cl.
| | |
|---|---|
| G08B 21/00 | (2006.01) |
| G08G 1/0967 | (2006.01) |
| G01C 21/26 | (2006.01) |
| B60K 35/00 | (2006.01) |
| G01S 19/13 | (2010.01) |
| G08G 1/123 | (2006.01) |

(52) U.S. Cl.
CPC ............. *G08G 1/0967* (2013.01); *B60K 35/00* (2013.01); *G01C 21/26* (2013.01); *G01S 19/13* (2013.01); *G08G 1/123* (2013.01)

(58) Field of Classification Search
CPC ...................................... G08B 1/0967
USPC ........ 340/425.5, 905, 539.1, 539.13; 705/304
See application file for complete search history.

(56) References Cited

U.S. PATENT DOCUMENTS

| | | |
|---|---|---|
| 5,223,844 A | 6/1993 | Mansell et al. |
| 6,429,773 B1 | 8/2002 | Schuyler |
| 6,603,405 B2 | 8/2003 | Smith |
| 6,693,563 B2 | 2/2004 | Flick |
| 7,212,916 B2 | 5/2007 | Alewine et al. |
| 2012/0191616 A1 | 7/2012 | Putman et al. |

*Primary Examiner* — Jeffery Hofsass
(74) *Attorney, Agent, or Firm* — Dierker & Kavanaugh, P.C.

(57) ABSTRACT

A trip plan is received at an in-vehicle application on a memory of an in-vehicle infotainment unit or at an application on a mobile device memory. The trip plan includes an expected trip duration and/or an expected trip return. An in-vehicle bus facilitates monitoring for a return event, or a mobile device monitoring system facilitates monitoring for a return event. In an example, a notification that the return event has been recognized is received at one of the applications. The return event is identified as having occurred prior to or at the expiration of the expected trip duration and/or return. In another example, one of the applications recognizes that the expected trip duration and/or the return has expired and that no notification of the return event has been received, and a pending alert notification is transmitted to another party.

19 Claims, 3 Drawing Sheets

US 9,349,290 B2

SELF-REPORTED TRACKING METHODS INCLUDING A TRIP PLAN WITH AN EXPECTED DURATION OR EXPECTED RETURN

TECHNICAL FIELD

The present disclosure relates generally to self-reported tracking methods.

BACKGROUND

Vehicles are often equipped with in-vehicle communications devices (e.g., telematics unit and/or infotainment units) or other in-vehicle controllers that enable hands free calling, vehicle tracking, navigation instruction transmission, and other like features. In-vehicle communications devices or other in-vehicle controllers may connect to a cellular network in order to enable these services/features.

SUMMARY

In an example of a self-reported tracking method, a trip plan is received at an in-vehicle application resident on a memory of an in-vehicle infotainment unit or at an application resident on a memory of a mobile device. The trip plan includes an expected trip duration, an expected trip return, or combinations thereof. An in-vehicle bus connected to the infotainment unit facilitates monitoring for a return event, or a monitoring system of the mobile device facilitates monitoring for a return event. In an example, a notification that the return event has been recognized is received at the in-vehicle application or a notification that the return event has been recognized is received at the mobile device application. The return event is identified as having occurred prior to or at the expiration of the expected trip duration and/or the expected trip return. In another example, the in-vehicle application recognizes that the expected trip duration and/or the expected trip return has expired and that no notification of the return event has been received, and a communications module of the infotainment unit transmits a pending alert notification to a party outside of the vehicle. In still another example, the mobile device application recognizes that the expected trip duration and/or the expected trip return has expired and that no notification of the return event has been received, and the mobile device transmits a pending alert notification to a party outside of the vehicle.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
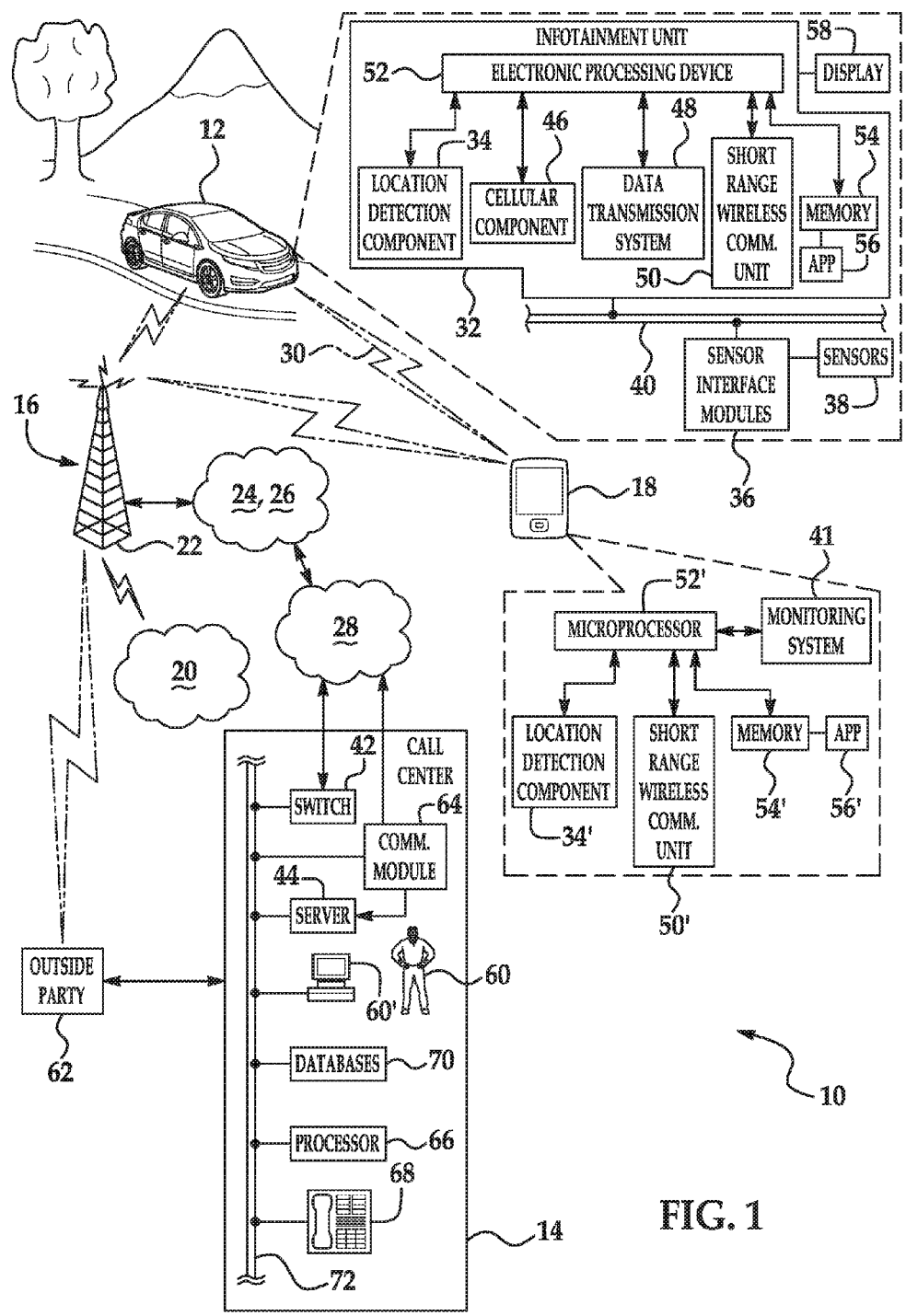
FIG. 1 is a schematic view of an example of a system for performing examples of the self-reported tracking method.

Example(s) of the system and method disclosed herein enable a user to initiate a self-reported tracking service. The service may be operated through the user's vehicle in combination with a server that the vehicle communicates with. In the examples disclosed herein, the self-reported tracking method may be initiated when a user inputs a trip plan using his/her vehicle. The trip plan may include many details, but at least includes a time setting, such as an expected trip duration and/or an expected trip return (both of which are discussed in more detail below). The vehicle and/or the expected duration/return is/are monitored while the user is on the trip. After expiration of the expected trip duration and/or expected trip return, it is determined whether or not a return event has been recognized. In the instances when the return event is not recognized, the vehicle and/or the server may utilize the trip plan details to notify a party outside of the vehicle of a potential situation, to locate the vehicle and/or user, etc.

The service may also be operated through the user's mobile communications device in combination with a server that the mobile device communicates with. In these examples, the self-reported tracking method may be initiated when a user inputs the trip plan using his/her mobile device. In this example, the mobile device and/or expected duration/return is/are monitored while the user is on the trip. After expiration of the expected trip duration and/or expected trip return, it is determined whether or not a return event has been recognized. In the instances when the return event is not recognized, the mobile device and/or the server may utilize the trip plan details to notify another party of a potential situation, to locate the mobile device and/or user, etc.

It is to be understood that, as used herein, the term "user" includes a vehicle owner or another authorized driver of the vehicle, or a mobile communications device owner or another authorized use of the mobile communications device. In some examples, the user is a customer of an in-vehicle infotainment unit service provider that operates the self-reported tracking service.

The term "communication" is to be construed to include all forms of communication, including direct and indirect communication. Indirect communication may include communication between two components with additional component(s) located therebetween.

Further, the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Examples of the system and method disclosed herein refer to a "return event." The return event may be recognizable by the vehicle, the mobile device, or a call center in communications with the vehicle and/or mobile device. In one example, the return event is an "ignition on or accessory power event." As used herein, the "ignition on or accessory power event" refers to the vehicle being started (i.e., going from an off state to an on state) or the electronics of the vehicle being started. While referred to as an "ignition on or accessory power event", this may pertain to the start of any vehicle or its electronics, e.g., a traditional gasoline or diesel powered vehicle, an electric vehicle, or a hybrid vehicle. The return event may also be coupled with the detection that the doors of the vehicle 12 have been unlocked. Other return events detectable by the vehicle include the vehicle system(s)

identifying the user biometrically, the vehicle short range wireless communication unit and the user's mobile device recognizing each other, or any other signal that would indicate to the vehicle that the user has returned. In still other examples, the return event is a "mobile device on event." As used herein, the "mobile device on event" refers to the mobile communications device being started (i.e., going from an off or sleep state to an on state). Other return events detectable by the mobile device include the mobile device recognizing that its location is the starting location or departure location for the trip, a user input indicating that the user has returned, or any other signal that would indicate to the mobile device that the user has returned.

FIG. 1 depicts an example of a system 10 for performing examples of the self-reported tracking method disclosed herein. The system 10 generally includes the vehicle 12, the call center 14, and the carrier/communication system 16, and in some instances also includes a mobile communications device 18 (also referred to herein as a mobile device) and an external information source 20. As is discussed in detail below, the system 10 may include the mobile communications device 18, the call center 14 and the carrier/communication system 16, without the vehicle 12.

Phone calls and/or messages (e.g., an alert notification, weather information, etc.) may be transmitted to, from, and/or between communication component(s) of the vehicle 12, communication component(s) of the call center 14, the mobile communications device 18 and/or the external information source 20 using the carrier/communication system 16. In an example, the carrier/communication system 16 is a two-way radio frequency (RF) communication system. The carrier/communication system 16 may include one or more cell towers 22 or satellites (not shown). It is to be understood that the carrier/communication system 16 may also include one or more base stations and/or mobile switching centers (MSCs) 24 (e.g., for a 2G/3G network), one or more evolved Node Bs (eNodeB) and evolved packet cores (EPC) 26 (for a 4G (LTE) network), and/or one or more land networks 28. The carrier/communication system 16 may be part of a cellular radio environment or a satellite radio environment, which may include a variety of wireless network providers (which include mobile network operator(s), not shown), utilizing the same or a variety of radio access technologies. While several examples have been provided, it is to be understood that the architecture of the wireless carrier/communication system 16 may be GSM (global system for mobile telecommunications), CDMA2000, UMTS (universal mobile telecommunications system), LTE (long-term evolution), or some other available architecture.

The communication links between the various components are shown as lightning bolts in FIG. 1. Some of the communications links (e.g., between the vehicle 12 and the cell tower 22, the vehicle 12 and the mobile communications device 18, and the mobile communications device 18 and the cell tower 22) are shown in phantom. This is indicative of the fact that these components may not always be able to establish a communication link with one another. For example, some of the examples disclosed herein involve a situation where the vehicle 12 and/or mobile communications device 18 is out of range of a cell tower 22 and/or where the mobile communications device 18 is not within range of the vehicle 12 to establish a short range wireless communication link 30.

In the system 10, the vehicle 12 may be a car, motorcycle, truck, or recreational vehicle (RV) that is equipped with suitable hardware and computer readable instructions/code that enable it to communicate (e.g., transmit and/or receive voice and data communications) over the carrier/communication system 16 and/or using the short range wireless communication link 30.

As shown in FIG. 1, the vehicle 12 includes an infotainment unit 32. The in-vehicle infotainment unit 32 is an on-board vehicle dedicated communications and entertainment device. In another example (not shown), the in-vehicle infotainment unit 32 is an on-board vehicle dedicated entertainment device that is in operative communication with a separate on-board vehicle dedicated communications device (e.g., a telematics unit). Whether integrated into a single unit (e.g., infotainment unit 32) or included as separate units, the on-board vehicle dedicated communications and entertainment device(s) include hardware components that are capable of running computer readable instructions/code, which are embodied on non-transitory, tangible computer readable media.

The in-vehicle infotainment unit 32 may provide a variety of services, both individually and through its communication with the mobile communications device 18 and/or the call center 14 (e.g., a facility that may be owned and operated by an in-vehicle infotainment unit service provider). Several examples of these services include, but are not limited to: self-reported tracking, turn-by-turn directions and other navigation-related services provided in conjunction with a location detection based chipset/component 34; airbag deployment notification and other emergency or roadside assistance-related services provided in connection with various sensor interface modules 36 and sensors 38 located throughout the vehicle 12; and infotainment-related services where music, Web pages, movies, television programs, videogames and/or other content is downloaded by the infotainment unit 32 via a vehicle bus system 40 and an audio bus system (not shown). The listed services are by no means an exhaustive list of all the capabilities of the infotainment unit 32, but are simply an illustration of some of the services that the in-vehicle infotainment unit 32 is capable of offering.

As noted above, the infotainment unit 32 may be used for vehicle communications. Some vehicle communications (e.g., between the vehicle 12 and a switch 42 or server 44 at the call center 14) utilize radio or satellite transmissions to establish a voice channel with the carrier/communication system 16 such that both voice and data transmissions may be sent and received over the voice channel. In some instances, vehicle communications are enabled through the infotainment unit 32 via a communications module, which includes a cellular chipset/component 46 for voice communications and a data transmission system 48 for data transmission. In an example, the data transmission system 48 may include a packet builder, which is programmed to make decisions about what packet to send (e.g., bandwidth, data to include, etc.) and to actually build the packet data message. In another example, the data transmission system 48 may include a wireless modem, which applies some type of encoding or modulation to convert the digital data so that it can communicate through a vocoder or speech codec incorporated in the cellular chipset/component 46. It is to be understood that any suitable encoding or modulation technique that provides an acceptable data rate and bit error may be used with the examples disclosed herein. While examples have been provided, it is to be understood that any suitable data transmission system 48 may be used.

The cellular chipset/component 46 of the infotainment unit 32 may be an analog, digital, dual-mode, dual-band, multi-mode and/or multi-band wireless transceiver. The cellular chipset-component 46 uses one or more prescribed frequencies in standard analog and/or digital bands in the current market for cellular systems. Any suitable protocol may be used, including digital transmission technologies, such as TDMA (time division multiple access), CDMA (code division multiple access), W-CDMA (wideband CDMA), FDMA (frequency-division multiple access), OFDMA (orthogonal frequency-division multiple access), etc.

The in-vehicle infotainment unit 32 may also be configured for short range wireless communication technologies, such as BLUETOOTH® and various classes thereof, dedicated short-range communications (DSRC), or WI-FI™ and various classes thereof. In these instances, the cellular chipset/component 46 may operate in conjunction with a short range wireless communication unit 50 of the infotainment unit 32. As described above, short range wireless communications may be suitable for communication between, for example, the vehicle 12 and the mobile communications device 18. In an example, the mobile communications device 18 may be capable of recognizing the device's geographic position/location and transmitting that position/location to the infotainment unit 32 using short-range wireless communication link 30. The use of short-range wireless communication technologies will depend, at least in part, on the distance of the vehicle 12 from the mobile communications device 18. For example, when the short range wireless communication unit 50 is configured for some BLUETOOTH® connections, the short-range wireless communication unit 50 may have a preset wireless access range, or may have a standard range from about 10 meters (i.e., about 32 feet) to about 91 meters (i.e., about 300 feet).

The infotainment unit 32 generally includes an electronic processing device 52 operatively coupled to one or more types of electronic memory 54, which has the in-vehicle application 56 resident thereon. In an example, the electronic processing device 52 is a micro-processor. In other examples, the electronic processing device 52 may be a micro controller, a controller, a host processor, and/or a vehicle communications processor. In another example, electronic processing device 52 may be an application specific integrated circuit (ASIC). Alternatively, electronic processing device 52 may be a processor working in conjunction with a central processing unit (CPU) performing the function of a general-purpose processor.

The electronic memory 54 of the infotainment unit 32 may be an encrypted memory that is configured to store i) computer readable instructions/code to be executed by the processor 52, ii) data associated with the various systems of the vehicle 12 (i.e., vehicle data), iii) vehicle operations, iv) vehicle user preferences and/or personal information, and the like. In an example, the electronic memory 54 stores computer readable instructions for generating a trip plan, for generating an alert notification, and for checking for a return event upon the expiration of an expected trip return/duration. For example, the electronic processing device 52 running the computer readable instructions may send a signal triggering a component of the communications module to transmit the alert notification to a party outside the vehicle 12 when no return event has been received and the expected trip return/duration has expired. The electronic memory 54 may also store the unique identifying code that can be used to establish a short range wireless communication link 30 with the mobile communications device 18.

In some examples, the previously mentioned in-vehicle application 56 may be downloaded (e.g., from an online application store or marketplace) and stored on the electronic memory 54. The in-vehicle application 56 includes computer readable instructions that enable the user to input his/her trip plan, and then save the trip plan in the memory 54 and/or transmit the trip plan to an entity outside of the vehicle 12.

The application 56 may be opened using an in-vehicle display 58. The display 58 may be operatively directly connected to or in communication with the infotainment unit 32. Examples of the display 58 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like. In an example, the display 58 is a full-color touch screen display.

The application 56 may or may not require the user to log in. Once opened, the application 56 enables the user to input his/her trip plan. The trip plan may include any details of an upcoming trip, excursion, etc. that the user is planning to take. Examples of the trip details may include a starting location, a time setting (i.e., the expected trip duration and/or expected trip return), the trip destination, the user's contact information, an emergency contact's contact information, and/or other miscellaneous trip related information. Examples of other miscellaneous trip related information include supplies the user is planning to take (e.g., food, clothing, equipment, such as tent, sleeping bag, etc., equipment information, such as sleeping bag temperature rating, etc.), a detailed description of the trip, information about people traveling with the user, etc. The application 56 may include input boxes for the user to input the trip information, drop down menus for the user to select trip information or categories from, a clock and/or calendar for the user to select time(s) and/or dates associated with the trip, or any other suitable mechanism for inputting the trip information.

In the examples disclosed herein, the user may be driving the vehicle 12 to a location where the trip begins (i.e., the starting location). For example, the user may drive to the location, and then depart from the vehicle to begin to the excursion. The starting location may be a point of interest (e.g., Yosemite National Park), an address, latitude and longitude coordinates, or other suitable location information (e.g., parking lot on Crater Rim Drive).

The expected trip duration may include the time and/or number of day(s) that the user expects to be gone on the excursion. As examples, the expected trip duration may be 8 hours from the time the trip plan is generated or from some other designated start time, or 3 days from the time the trip plan is generated or from some other designated start day/time, etc. The expected trip duration may also include an expected departure time and/or date and an expected return time and/or date. The expected trip return may include the time and/or date that the user expects to be back from the excursion. When the expected trip return is used, the application 56 will automatically conclude that the start of the trip is at the point that the trip plan is saved. As examples, the expected trip return may be 6:00 pm on a certain date, or June 19 at any time, etc. In some examples, the trip plan may include both the expected trip duration and the expected trip return. For example, the trip plan may indicate that user is leaving on a particular Sunday and plans to return by 5 pm the following Saturday. It is to be understood that the user may not specify an exact time if he/she is unsure as to the time of day he/she will return (e.g., leaving Sunday, May 25 and returning the following Wednesday). Furthermore, if a user thinks he/she may extend the trip while the trip is in progress, he/she may incorporate some additional time into the expected trip duration and/or return when making the trip plan. For example, if the user has not yet decided whether his/her trip will include hiking an additional 15 miles to see a waterfall, he/she may set the trip duration and/or return to include the time that this excursion would add to the trip. Building additional time into the expected trip duration and/or return may keep the application 56 from prematurely generating an alert notification.

The user's contact information may include his/her phone number, email address, address, etc. In an example, the user's contact information includes his/her mobile phone number. In some instances, the application 56 may be programmed to retrieve the user's contact information from the memory 54 or to request the information from a user profile stored at the call center 14.

The emergency contact (e.g., in case of emergency or ICE contact) may be any person that the user designates. The information of the emergency contact may include his/her name, phone number(s), email address, address, and/or the like.

As noted above, any other miscellaneous trip related information may be included in the trip plan. Miscellaneous trip related information may be about the excursion itself. For example, if the user is planning to go mountain biking, he/she may indicate that the route is a 25 mile loop starting and ending at the same location. For another example, if the user is planning to go on a hike, he/she may indicate that he/she is going to a particular destination via a particular route (e.g., hiking to Machete Ridge via Balconies Cave Trail). For still another example, if the user is planning to go skiing on Mount Hood, he/she may include particles routes he/she intends to ski. When the vehicle 12 includes a navigation unit, the other miscellaneous trip related information may include a digital map of the planned route. In this example, the application 56 enables the user to access the navigation unit in order to input (e.g., using the display 58) the actual planned route as part of the trip plan.

Other miscellaneous trip related information may be about the user's preparation for the trip. For example, if the user is planning to hike the Kilauea Iki Trail, he/she may include that he/she intends to turn left at the trailhead toward the Thurston Lava tube, and that he/she plans to take water, snacks, raingear, and sun protection. While several examples of the miscellaneous trip related information have been provided, it is to be understood that the application 56 may allow the user to input any additional information that the user may regard as being pertinent to the trip plan.

The application 56 may be in contact with the external information source 20 through the carrier/communication system 16. In an example, the external information source 20 is an Internet-based weather source or a weather source located at the call center 14. When the user inputs the trip plan, the application 56 may be programmed to inquire as to whether the user would like to check the weather forecast for the general location, the starting location, the destination location, etc. of the trip during the specified time period. If the user responds no (e.g., using the display or a verbal cue), the application 56 will move on to the next step in the trip plan generation process (e.g., saving the trip plan). If the user responds yes, the application 56 will obtain the weather forecast from the external information source 20. In an example, the application 56 may provide the location of the trip and the specified time period of the trip to the external information source 20 with a request for the forecast. In response, the external information source 20 will generate and transmit the weather forecast back to the application 56. Upon receiving the forecast, the application 56 can present the forecast to the user via the display 58.

After the forecast is received and displayed for the user, the application 56 may be programmed to inquire as to whether the user would like to alter the trip plan. This may be a default application setting, in which the application 56 asks about altering the trip whenever weather related information is retrieved. Alternatively, the forecast may include an indication as to the severity of the weather, and the application 56 may be programmed to identify the indication, and then ask about altering the trip whenever the indication includes a watch, a warning, an advisory, or some other notification that the weather may be undesirable during the trip. In this example, the application 56 provides the option for the user to update the trip plan based upon the weather forecast.

The application 56 also enables the user to save the generated trip plan. In an example, after the trip plan is entered by the user, the application 56 may prompt the user to i) save the trip plan in the memory 54, or ii) transmit the trip plan to the call center server 44. In the latter example, at least some of the computer readable instructions of the in-vehicle application 56 provide an interface for the user to communicate with the call center server 44 through the infotainment unit 32. As is discussed further below, the application 56 may also be programmed to automatically save the plan to the memory 54 or transmit the plan to the call center server 44 based upon the network coverage area of the carrier/communication system 16 at the starting location of the trip plan.

The application 56 may also programmed to generate an alert notification. In an example, the application 56 may generate the alert notification in response to the generation and storage of the trip plan. In another example, the application 56 may generate the alert notification after recognizing that the trip duration and/or return has expired, and upon recognizing the lack of a return event. Generally, the alert notification is a message indicating that a user's trip plan has expired and that the user appears to have not returned to the vehicle 12. The alert notification may also include more explicit details of the trip plan (e.g., a digital map), user and/or emergency contact information, and/or one or more location/position updates received by the vehicle 12 from the mobile communications device 18. The application 56 includes computer readable instructions for generating the message; and, in some instances, also includes computer readable instructions for temporarily storing the message. The alert notification may also include a header, which identifies the vehicle 12 from which the alert notification is being sent. As is discussed further below, the application 56 may also be programmed to cancel/delete a pending alert notification, or to initiate the transmission of the (pending) alert notification to a party outside of the vehicle 12.

The application 56 is also capable of receiving information from other vehicle components. For example, the application 56 may receive an indication/notification (through the vehicle bus 40) that the return event has been sensed by one of the vehicle sensors 38. In one example, upon receiving the return event notification, the application 56 may cross-check a time stamp of the return event notification with the expected trip duration and/or return. If the time stamp of the return event notification is at or before the expiration of the expected trip duration/return, the application 56 may be programmed to cancel/delete any pending alert notifications.

It is to be understood that the application 56 may be programmed to request user identification (e.g., through a previously set personal identification number, password, etc.) prior to cancelling any pending alert notifications.

In another example, the application 56 may recognize that the trip plan duration and/or return has expired, and then may determine whether or not the return event notification has been received. If the return event notification had previously been received (i.e., at or before the trip plan expiration), the application 56 may be programmed to cancel any pending alert notifications as previously described. When the return event notification has not been received and the trip plan duration and/or return has expired, the application 56 may be programmed to initiate the transmission of the pending alert notification, or to generate the alert notification and to initiate its transmission. The transmission of the alert notification is discussed more in reference to FIG. 2.

In some instances, a user may return to the vehicle 12 after the transmission of the alert notification. For example, if a user gets lost, or decides to stop for food, or encounters some other delay on the trip, he/she may return to the vehicle 12 after the expiration of the trip plan duration and/or return. If the application 56 receives the return event notification after the trip plan expiration and within some preset period (e.g., 24 hours), the application 56 may be programmed to ask the in-vehicle occupant if he/she would like to transmit a cancellation of the previously sent alert notification. The application 56 may emit a verbal inquiry that is played through a vehicle speaker or may display a textual inquiry on the in-vehicle display 58. In this example, the application 56 may also be programmed to request user identification (e.g., through a previously set personal identification number, password, etc.) prior to initiating the transmission of the cancellation of the previously sent alert notification. In response to the cancellation, the receiving party may cease in continuing with acting on the previously sent alert notification.

As shown in FIG. 1, the infotainment unit 32 may also include the location detection chipset/component 34, which may include a GPS receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown). The location detection chipset/component 34 may also include, for example, Glonass (i.e., global navigation satellite system), Sbas (i.e., satellite-based augmentation systems), or a D-GPS (differential global positioning system). The location detection chipset/component 34 may or may not be part of an in-vehicle navigation unit.

While not shown, it is to be understood that the in-vehicle infotainment unit 32 may also include a real-time clock (RTC), a short-range wireless antenna, and/or a multi-band or multi-mode antenna. The real-time clock (RTC) provides accurate date and time information to the in-vehicle infotainment unit 32 hardware and software components that may require and/or request date and time information. In an example, the RTC may provide date and time information for a return event. In an example, the short-range wireless antenna services the short-range wireless communication unit 50 and the multi-band or multi-mode antenna services the location detection chipset/component 34 and the cellular chipset/component 46. The multi-band or multi-mode antenna may, however, handle a variety of services, such as cellular, location (e.g., GPS), radio, short range (e.g., WI-FI™). In other instances, separate antennas are used for each service, or separate antennas are used for certain combinations of services. It is to be understood that the in-vehicle infotainment unit 32 may be implemented without one or more of the above listed components. It is to be further understood that in-vehicle infotainment unit 32 may also include additional components and functionality as desired for a particular end use.

The infotainment unit 32 is also operatively connected to the vehicle bus system 40 (which facilitates monitoring, e.g., by the application 56, which includes one example of a monitoring system). The vehicle bus system 40 may utilize a variety of networking protocols, such as a controller area network (CAN), a media oriented system transfer (MOST), a local interconnection network (LIN), an Ethernet, TCP/IP, and other appropriate connections such as those that conform with known ISO, SAE, and IEEE standards and specifications, to name a few. The vehicle bus system 40 enables the vehicle 12 to send signals (e.g., real-time bus messages, alert notifications) from the infotainment unit 32 (and application 56 resident on the memory 54) to various units of equipment and systems both outside the vehicle 12 and within the vehicle 12. The vehicle bus system 40 also enables the vehicle 12 to receive signals at the infotainment unit 32 from various units of equipment and systems both outside the vehicle 12 and within the vehicle 12 (e.g., from ignition on sensors 38, biometric recognition devices, etc.). Examples of signals received by the vehicle bus 40 include those indicating a vehicle occupant has left the vehicle 12 (e.g., door(s) closing and locking after the ignition is turned off), those indicating a vehicle occupant has returned to the vehicle 12 (e.g., door(s) unlocking followed by the ignition being turned on or verification of user biometrics), etc.

The infotainment unit 32 may also include an audio component that receives analog information, rendering it as sound, via an audio bus system (not shown). Digital information may be received at the infotainment unit 32 via the vehicle bus system 40. The audio component may provide AM and FM radio, high-definition radio, satellite radio, CD, DVD, multimedia, and other like functionality, in conjunction with the controller/processor 52 of the infotainment unit 32. The infotainment unit 32 may contain a speaker system, or may utilize vehicle speaker(s) (not shown) via arbitration on vehicle bus system 40 and/or audio bus system.

As illustrated in FIG. 1, the vehicle 12 may also include other vehicle systems that are connected to the vehicle bus system 40. Examples of these other vehicle systems may include any vehicle sensors 38 (e.g., ignition on sensors, crash/collision sensors, electronic system power sensors, door lock and unlock sensors, etc.). The ignition on sensor provides information to the infotainment unit 32 via a sensor interface module 36 regarding when the vehicle 12 has been turned on. The ignition on sensor may vary depending upon the type of vehicle 12 (e.g., an internal combustion engine vehicle, a hybrid vehicle, or an electric vehicle). The electronic system power sensor provides information to the infotainment unit 32 via a sensor interface module 36 regarding when the vehicle electronics have been turned on. Examples of the sensor interface modules 36 include a powertrain control module, a climate control module, a body control module, and/or the like.

As mentioned above, in some examples, the system 10 also includes the mobile communications device 18. In an example, the mobile communications device 18 may be a smart phone, such as a GSM/LTE phone or a GSM/CDMA/LTE phone. In other examples, the mobile communications device 18 may be any portable device that has at least a location detection based chipset/component 34' and a short range wireless communication unit 50'. Examples of other mobile communications devices 18 include a smart watch, helmet, key fob, etc., each of which may be, for example, GPS and BLUETOOTH® enabled.

In addition to the location detection based chipset/component 34' and the short range wireless communication unit 50', the mobile communications device 18 may also include physical hardware (e.g., a micro-processor 52') and computer readable instructions stored in a memory 54'. The microprocessor 52' of the mobile communications device 18 may be similar to processor 52, and is capable of executing the computer readable instructions stored in the memory 54'.

Some examples of the mobile communications device 18 may include a wireless communications module, which, in addition to the short range wireless communication unit 50', also includes a cellular chipset/component for voice communications and a wireless modem for data transmission. In these examples, the mobile communications device 18 is capable establishing short range wireless connections and is also capable of making cellular or satellite connections (over the wireless carrier/communication system 16).

In some of the examples disclosed herein, the user may take his/her mobile communications device 18 with him/her while on the trip/excursion. The location detection based chipset/component 34' may be able to determine the position/location of the mobile communications device 18 while the user is on the trip.

The short range wireless communication unit 50' may be used to transmit the position/location data of the mobile communications device 18 to the vehicle 12. For example, when the mobile communications device 18 is paired with the vehicle 12 and is within a range suitable for establishing the short range wireless communication link 30, the mobile communications device 18 may be programmed to retrieve the position/location data using the location detection based chipset/component 34' and to transmit the retrieved position/location data to the vehicle 12.

In some instances, a cellular chipset/component (not shown) of the mobile communications device may be used to transmit the position/location data of the mobile communications device 18 to the call center server 44. For example, when the mobile communications device 18 is within network coverage of the carrier/communication system 16, the mobile communications device 18 may be programmed to retrieve the position/location data using the location detection based chipset/component 34' and to transmit the retrieved position/location data to the call center server 44.

The retrieval and transmission of mobile communications device position/location data may occur at predetermined intervals (e.g., according to some default setting) or at intervals set by the user, as long as the location detection based chipset/component 34' is able to obtain the data and as long as the short range wireless communication link 30 or a cellular connection can be established. This data may be received by the application 56 (via link 30) or the call center server 44 (via cellular connection), either of which in turn may use the data in the alert notification.

It is to be understood that the mobile communications device 18 has a unique identifying code (e.g., a wireless connection key) that is used to pair the device 18 with the infotainment unit 32 of the vehicle 12 (e.g., over short range wireless communication link 30). The mobile communications device 18 and the infotainment unit 32 are paired when the device 18 and unit 32 exchange unique identifying codes with each other. This enables the device 18 and unit 32 to communicate typically under a secured connection. As a more specific example, initial pairing may involve setting the mobile communications device 18 to a short range wireless discovery mode (such as by selecting, on the device 18, a discovery mode function as a menu option, icon, or the like). While in the discovery mode, other devices having a short range wireless communication unit (such as the infotainment unit 32) are allowed to detect the presence of the mobile communications device 18. When the infotainment unit 32 locates the mobile communications device 18, the mobile communications device 18 automatically provides the type of device it is (e.g., a smart phone, a watch, a key fob, etc.) and its short range wireless connection name. The mobile communications device 18 may then prompt the user to enter a security code/password, and then the unique identifying code of the mobile communications device 18 is sent to the infotainment unit 32. Upon receiving the unique identifying code, the infotainment unit 32 sends its own unique identifying code to the mobile communications device 18 to ultimately pair the two devices 18, 32 together.

Once the device 18 and unit 32 have been paired and whenever within short range wireless communication range of each other, the mobile communications device 18 can directly communicate with the infotainment unit 32. This communication may be desirable, for example, when the user is on the trip, but, in some instances, is not within the coverage area of the carrier/communication system 16.

As shown in FIG. 1, the mobile communications device 18 may have the application 56' resident on its memory 54'. This may be desirable when the mobile communications device 18 is to be used to plan the trip, is to monitor the trip duration/return, and/or is to be in within the coverage area of the carrier/communication system 16 while the user is on the trip. When the application 56' is resident on the mobile communications device 18, the vehicle 12 may be used to get to the starting point of the trip, but may not be part of the self-reported tracking system 10. In these examples, the mobile communications device 18 may also include a monitoring system 41 (discussed below) operatively connected to the micro-processor 52'.

In this example, the in-vehicle application 56' may be downloaded (e.g., from an online application store or marketplace) and stored on the electronic memory 54'. The in-vehicle application 56' includes computer readable instructions that enable the user to input his/her trip plan, and then save the trip plan in the memory 54' and/or transmit the trip plan to an entity outside of the vehicle 12. The application 56' may be opened using a display of the mobile communications device 18. In an example, the display is a full-color touch screen display.

The application 56' may or may not require the user to log in. Once opened, the application 56' enables the user to input his/her trip plan as previously described in reference to the application 56. It is to be understood that the application 56' may be in contact with the external information source 20 through the carrier/communication system 16.

The application 56' also enables the user to save the generated trip plan. In an example, after the trip plan is entered by the user, the application 56' may prompt the user to i) save the trip plan in the memory 54', or ii) transmit the trip plan to the call center server 44. In the latter example, at least some of the computer readable instructions of the mobile device application 56' provide an interface for the user to communicate with the call center server 44. The application 56' may also be programmed to automatically save the plan to the memory 54' or transmit the plan to the call center server 44 based upon the network coverage area of the carrier/communication system 16 at the starting location of the trip plan.

The application 56' may also be programmed to generate an alert notification. In an example, the application 56' may generate the alert notification in response to the generation and storage of the trip plan. In another example, the application 56' may generate the alert notification after recognizing that the trip duration and/or return has expired, and upon recognizing the lack of a return event. Generally, the alert notification is a message indicating that a user's trip plan has expired and that the user appears to have not returned to the mobile communications device 18 (which may have been left at the user's residence, in his/her vehicle 12 at the starting location, in his/her hotel room, etc.) or that the mobile communications device 18 has not returned to the starting location of the trip. In this example, the alert notification may also include more explicit details of the trip plan (e.g., a digital map), user and/or emergency contact information, and/or the then-current location/position of the mobile communications device 18.

The application 56' includes computer readable instructions for generating the message; and, in some instances, also includes computer readable instructions for temporarily storing the message. The alert notification may also include a header, which identifies the mobile communications device 18 from which the alert notification is being sent. The application 56' may also be programmed to cancel/delete a pending alert notification, or to initiate the transmission of the (pending) alert notification to another party.

The application 56' is also capable of receiving information from other mobile communications device components. For example, the application 56' may receive an indication/notification from the monitoring system 41 that the return event has been sensed by the monitoring system 41. In an example, the monitoring system 41 is configured to recognize that the mobile communications device 18 has been turned on from an off state or has been transitioned from a sleep mode to an on state. In another example, the monitoring system 41 is configured to recognize that the mobile communications device 18 has returned to the starting location/departure point of the trip. In still another example, the monitoring system 41 is configured to recognize a user input indicating that the user has returned (e.g., the user speaks into the device microphone, "I'm home," "I am back," etc.).

In one example, upon receiving the return event notification, the application 56' may cross-check a time stamp of the return event notification with the expected trip duration and/or return. If the time stamp of the return event notification is at or before the expiration of the expected trip duration/return, the application 56' may be programmed to cancel/delete any pending alert notifications. It is to be understood that the application 56' may be programmed to request user identification (e.g., through a previously set personal identification number, password, etc.) prior to cancelling any pending alert notifications.

In another example, the application 56' may recognize that the trip plan duration and/or return has expired, and then may determine whether or not the return event notification has been received. If the return event notification had previously been received (i.e., at or before the trip plan expiration), the application 56' may be programmed to cancel any pending alert notifications as previously described. When the return event notification has not been received and the trip plan duration and/or return has expired, the application 56' may be programmed to initiate the transmission of the pending alert notification, or to generate the alert notification and to initiate its transmission.

The application 56' may also be programmed so that if the application 56 receives the return event notification after the trip plan expiration and within some preset period (e.g., 24 hours), the application 56' asks the mobile communications device user if he/she would like to transmit a cancellation of the previously sent alert notification.

As mentioned above, the system 10 also includes the call center 14. In some of the examples disclosed herein, the user of the vehicle 12 is a customer of the infotainment unit service provider that operates the call center 14 and the server 44, and thus the server 44 is in selective communication with the vehicle 12. In other of the examples disclosed herein, the user of the mobile communications device 18 is a customer of a mobile communications service provider that operates the call center 14 and the server 44, and thus the server 44 is in selective communication with the mobile communications device 18.

The call center 14 is capable of communicating with the infotainment unit 32 when the vehicle 12 is within the coverage area of the carrier/communication system 16, and/or with the mobile communications device 18 when it is within the coverage area of the carrier/communication system 16. In some examples, the call center 14 is the third party that receives the alert notification from the application 56 or application 56', through the communications module of the infotainment unit 32 or the mobile communications device 18, and the server 44. In other examples, the call center 14 receives the entire trip plan from the application 56 or 56', through the communications module of the infotainment unit 32 or the mobile communications device 18, and the server 44. The call center server 44 is also capable of transmitting command signals and/or requests to the vehicle 12 and/or the mobile communications device 18.

In general, the call center server 44 is a system of computer hardware and computer readable instructions that are capable of responding in a number of ways after learning that the user has not returned from his/her trip in accordance with the duration and/or return noted in the trip plan.

For example, in response to receiving the alert notification from the application 56 or 56', the call center server 44 may include computer readable instructions that initiate the transmission of the alert notification to a call center advisor 60, 60'. The call center server 44 may recognize the vehicle 12 or mobile communications device 18 from which the alert notification is being received (through the mobile dialing number, vehicle identification number, infotainment unit serial number, mobile communications device serial number, etc. that is transmitted in a header of the alert notification). The call center server 44 may include computer readable instructions that use the identified vehicle 12 or mobile communications device 18 to automatically looking up any emergency contact information that may be saved in an associated account of the vehicle user or mobile communications device user. In this example, the server 44 may be programmed to initiate the transmission of both the alert notification and the retrieved emergency contact information to the advisor 60, 60'.

In another example, in response to receiving the trip plan from the application 56 or 56', the call center server 44 may include computer readable instructions for setting an alarm in accordance with the user's expected return time, as set forth in the expected trip duration and/or expected trip return. In one example when the alarm goes off, the call center server 44 may be programmed to transmit a location request to the infotainment unit 32 of the vehicle 12. If the vehicle 12 responds, the call center server 44 may be programmed to delete the trip plan and take no further action. If the vehicle 12 does not respond, the call center server 44 may be programmed to generate an alert notification that is to be sent to another party 62 outside of the call center 14 and outside of the vehicle 12. In some examples, the party 62 may be an emergency contact identified in the trip plan and/or in the vehicle user's account and/or emergency personnel (e.g., EMS, police, fire, etc.). In another example when the alarm goes off, the call center server 44 may be programmed to call the mobile communications device 18. If the user answers the call, the call center server 44 may be programmed to delete the trip plan and take no further action. If the user does not answer the call, the call center server 44 may be programmed to generate an alert notification that is to be sent to another party 62 outside of the call center 14.

The call center server 44 may be configured to receive information (e.g., the alert notification or trip plan) from the infotainment unit 32 or the mobile communications device 18 in the form of a computer-readable message (an example of which includes packet data). In this example, a communications module 64 receives the computer-readable message, and upon receiving and reviewing the data in the message, the communications module 64 transmits the data to the server 44. The server 44 includes software (to be run by processor 66 or another processor associated with the server 44) that is capable of performing one or more of the actions previously described.

The call center processor 66, which is often used in conjunction with telecommunication and computer equipment 68, is generally equipped with suitable software and/or programs enabling the processor 66 (and call center server 44) to accomplish a variety of call center functions. Further, the various operations of the call center 14 may be carried out by one or more computers (e.g., computer equipment 68) programmed to carry out some of the tasks of the call center 14. The telecommunication and computer equipment 68 (including computers) may include a network of servers (including server 44) coupled to both locally stored and remote databases (e.g., database 70) of any information processed.

The call center 14 also includes switch(es) 42. The switch 42 may be a private branch exchange (PBX) switch. The switch routes incoming signals so that voice transmissions are usually sent to either the live advisor 60 or the automated response system 60', and data transmissions are passed on to a modem or other piece of equipment (e.g., communications module 64) for demodulation and further signal processing. The modem preferably includes an encoder, as previously explained, and can be connected to various devices such as the server 44 and database 70.

The call center 14 also includes live and/or automated advisors 60, 60'. Each advisor 60, 60' may be associated with a workstation, including telecommunication and computer equipment 68. When transmissions from the server 44 are received by the telecommunication and computer equipment 68 of the live advisor 60, the computer equipment 68 may be programmed to notify the live advisor 60 to contact the outside party 62 via an on-screen alert or another suitable message. The live advisor 60 may then use a phone to contact the outside party 62. When transmissions from the server 44 are received by the telecommunication and computer equipment 68 of the automated advisor 60', the telecommunication equipment 68 may be programmed to call the outside party 62 or to transmit an electronic message (e.g., email, text and/or SMS message) to the outside party 62. When the automated advisor 60' is used, the automated advisor 60' may provide the outside party 62 (e.g., in the form of a text message) with a number to call or a link to a website in order to receive more information about the user and the situation.

The database(s) 70 at the call center 14 may be designed to store vehicle record(s), subscriber/user profile records, or any other pertinent subscriber and/or vehicle information and/or mobile communications device information. In an example, the database(s) 70 may be configured to store the user profile, which may contain personal information of the subscriber (e.g., the subscriber's name, garage/home address, billing address, home phone number, cellular phone number, etc.), as well as the user's in case of an emergency (ICE) contact information (e.g., the contact's name, home phone number, cellular phone number, etc.). It is to be understood that the databases 70 may allow the call center 14 to function as a repository for data collected from the vehicle 12, the mobile communications device 18, and/or from the vehicle owner/driver and/or mobile device owner. In some instances, another facility may function as a repository for collected data (e.g., a customer relationship management system (not shown) associated with the call center 14 whose database(s) the server 44 or advisors 60, 60' can access).

As illustrated in FIG. 1, the various call center components are coupled to one another via a network connection or bus 72, such as one similar to the vehicle bus 40 previously described.

It is to be appreciated that the call center 14 may be any central or remote facility, manned or unmanned, mobile or fixed, to or from which it is desirable to exchange voice and data communications. As such, the live advisor 60 may be physically present at the call center 14 or may be located remote from the call center 14 while communicating therethrough.

The call center 14 shown in FIG. 1 may also be virtualized and configured in a Cloud Computer, that is, in an Internet-based computing environment. For example, the computer equipment 68 may be accessed as a Cloud platform service, or PaaS (Platform as a Service), utilizing Cloud infrastructure rather than hosting computer equipment 68 at the call center 14. The database 70 and server 44 may also be virtualized as a Cloud resource. The Cloud infrastructure, known as IaaS (Infrastructure as a Service), typically utilizes a platform virtualization environment as a service, which may include components such as the processor 66, database 70, server 44 and computer equipment 68. In an example, some of the self-reported tracking software and services disclosed herein may be performed in the Cloud via the SaaS (Software as a Service). For example, received alert notifications and/or trip plans may be acted upon by the server 44 in conjunction with the automated advisor 60', which may be configured as a service present in the Cloud.

As mentioned above, the system 10 shown in FIG. 1 enables a user to initiate a self-reported tracking method in the event that he/she does not return to his/her vehicle 12 or mobile communications device 18 by a user-specified date and/or time. Different examples of the self-reported tracking method 200 and 300 involving the vehicle 12 are shown, respectively, in FIGS. 2 and 3. It is to be understood that various components of the system 10 of FIG. 1 may be referenced throughout the discussion of FIGS. 2 and 3, but may not be shown in FIGS. 2 and/or 3. Furthermore, it is to be understood that the method 200 may be implemented with the mobile communications device 18, the application 56', and the monitoring system 41. In addition, while the mobile communications device 18 is mentioned in FIG. 3, it is to be understood that the trip plan be generated using the device 18 and the application 56'.

Figure 2:
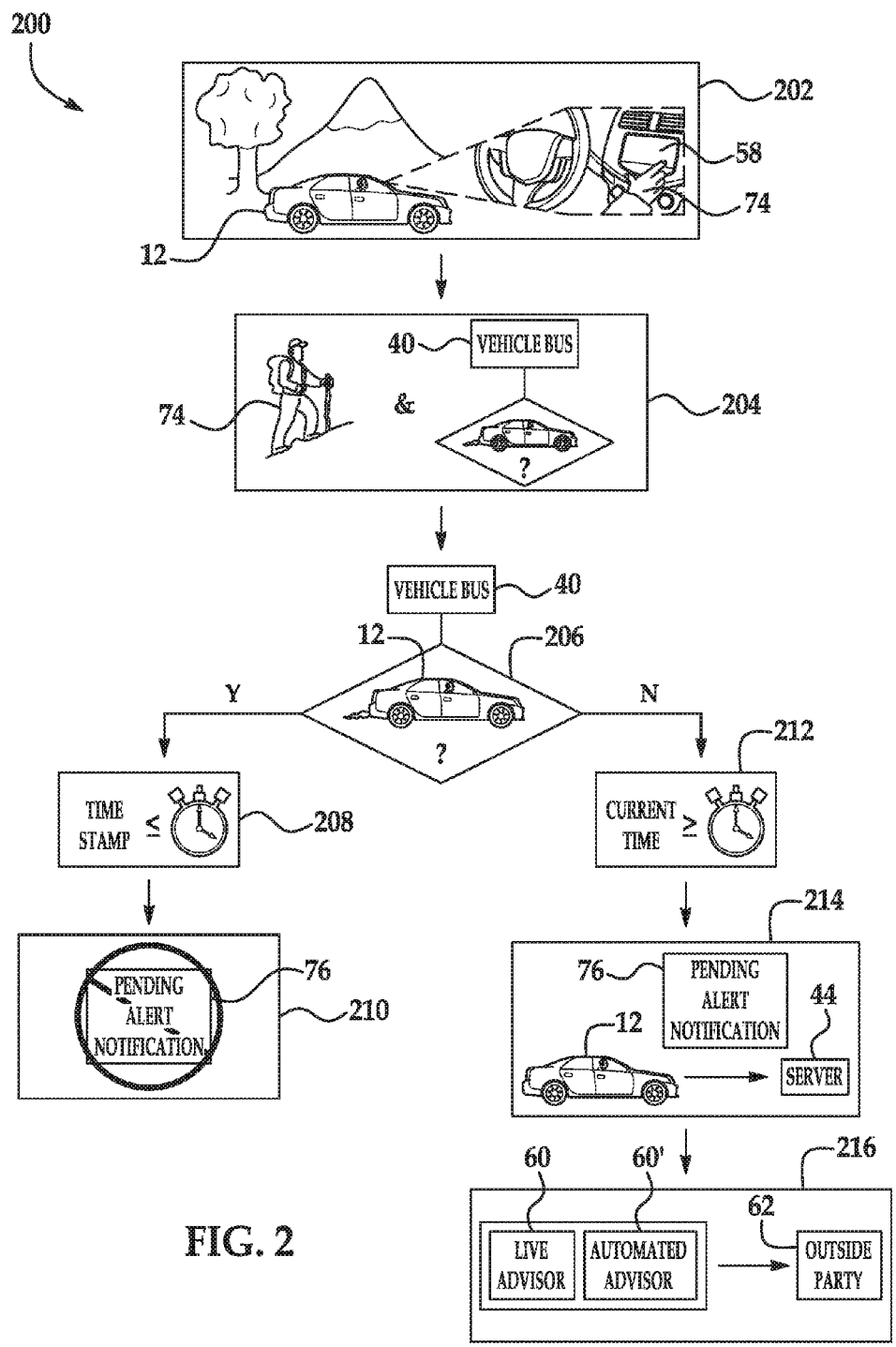
FIG. 2 is a schematic flow diagram illustrating an example of the self-reported tracking method.

The method 200 shown in FIG. 2 involves the user 74 driving the vehicle 12 to the starting location of the trip. At the starting location, the user may input the trip plan using the application 56. In this example, the application 56 may recognize that the current location of the vehicle 12 (i.e., the starting location) is within the network coverage of the vehicle's communication (e.g., cellular) service provider. As such, the vehicle 12 is capable of communicating with the call center 14 while the vehicle 12 is parked at the starting location. Since the vehicle 12 is capable of communicating with the call center 14, the self-reported tracking method may take place within the vehicle 12, as it is capable of transmitting the alert notification to the call center 14 or another party 62 if the circumstances warrant such as transmission.

The method 200 shown in FIG. 2 may also involve the user 74 inputting the trip plan away from the starting location of the trip (e.g., at the vehicle's garage address). In this example, when the user 74 is inputting the trip plan, the application 56 may be programmed to recognize that the entered starting location is within the network coverage area. In an example, the application 56 can access a network coverage map that indicates the strength of signals in geographic areas in order to determine that the designated starting location is within network coverage. Since the vehicle 12 will be capable of communicating with the call center 14 at the starting location, the self-reported tracking method may take place within the vehicle 12, as it is capable of transmitting the alert notification to the call center 14 if the circumstances warrant such as transmission.

As shown at box 202, the user 74 inputs the trip plan using the application 56 and the in-vehicle display 58. The trip plan includes at least the expected trip duration (e.g., from June 2 to June 5) and/or the expected trip return (e.g., returning June 5).

As mentioned above, while inputting the trip plan, the application 56 may provide the user 74 with option(s) for altering the plan based upon weather information received by the application 56 from the external information source 20. For example, the external information source 20 may indicate that a snow storm is expected to hit near the user's planned route at some point during the trip period, and the application 56 may display a message to the user asking if he/she would like to alter the trip plan in light of the forecasted storm. The user may or may not alter the trip plan.

In this example, once the trip plan is complete, it is stored in the memory 54. The application 56 may be programmed to recognize that the vehicle 12 is within the network coverage when the trip plan is entered, and may automatically save the trip plan in the memory 54.

Once the trip plan is saved, the application 56 may also generate the alert notification (including at least a notice that the trip plan has expired and that no return event has been detected), and store the alert notification as a pending alert notification in the memory 54. It is to be understood that the alert notification is not sent out at this point, but rather is saved. Alternatively, the application 56 may not generate the alert notification at this point, and may be programmed to generate the alert notification after recognizing that the trip duration and/or return has expired, and upon recognizing the lack of a return event.

As shown at box 204, the user 74 then begins his/her trip. The vehicle 12 remains parked at the starting location.

Box 204 also depicts the vehicle bus 40, which facilitates monitoring for the return event while the user is on the trip. In an example, the storage of the trip plan in the memory 56 may trigger the monitoring for the return event. In another example, the trip plan itself may include a start monitoring time and/or date, and the application 56 may trigger the monitoring for the return event when the start monitoring time and/or date arrives. In still another example, the detection of an event indicating that the user has left the vehicle 12 may trigger the monitoring for the return event. An example of an event indicating the user has left the vehicle 12 includes the combination of the vehicle 12 being turned off and the doors being locked. This event can trigger the monitoring for the return event.

Box 206 is also illustrative of the vehicle bus 40 facilitating the monitoring for the return event during the entire trip duration.

If the vehicle 12 is started, or the electronics of the vehicle 12 are powered on, or the user is identified by the vehicle 12, or some other return event is detected, the vehicle bus 40 will receive a signal from an appropriate vehicle sensor 38 or other system indicating that the return event has occurred. In this example, the vehicle bus 40 transmits a notification to the application 56, which informs the application 56 that the return event has occurred. In one example, the notification also includes a time stamp of the return event (which may be provided by the real time clock). In another example, the application 56 may associate a time stamp with the receipt of the return event.

The application 56 then cross-checks the time stamp of the return event notification with the expected trip duration and/or return. In the example shown in box 208 of FIG. 2, the time stamp (shown as "TS") of the return event notification is at or before (i.e., ≤) the expiration of the expected trip duration/return (represented by the clock). In this example, the application 56 may be programmed to cancel/delete any pending alert notifications 76, represented in box 210. The application 56 may also be programmed to cancel/delete the trip plan, or to display a message on the display 58 asking the user 74 he/she wants to cancel/determine the trip plan. If the pending alert notification 76 had not been generated and stored, the application 56 will not have to cancel/delete any pending alert notifications 76, but may proceed with cancelling/deleting the trip plan, or displaying a message on the display 58 asking the user 74 he/she wants to cancel/determine the trip plan.

If the vehicle 12 is not started, or the electronics of the vehicle 12 are not powered on, or the user is not identified by the vehicle 12, or some other return event is not detected, the vehicle bus 40 will not receive a signal from the appropriate sensor 38 or other vehicle system indicating that the return event has occurred. In some instances, the vehicle bus 40 will also listen for signals indicating that the user has returned to the vehicle 12 (e.g., a door(s) unlocked signal), and when this type of signal is not received, this indicates that the user has not returned to the vehicle 12. In this example, no notification is transmitted to the application 56, but rather the application 56 identifies that the trip plan has expired. The application 56 may include computer readable instructions for setting an alarm in accordance with the trip expiration time and/or date, as set forth in the expected trip duration and/or expected trip return. When the current time and/or date correspond(s) with the trip expiration time and/or date, the alarm will notify the application 56 of the trip expiration. This is illustrated in box 212, where the current time CT is at or after (i.e., ≥) the expiration of the expected trip duration/return (represented by the clock).

In this instance, the application 56 recognizes and identifies both the trip expiration and the fact that no notification of the return event has been received. These circumstances indicate that the user 74 has not returned to the vehicle 12 within the trip plan period, and that the user 74 may be in need of assistance. In the example shown in FIG. 2, the vehicle 12 (through the application 56, one or more components of the infotainment unit communications module, the vehicle bus 40, and the carrier/communication system 16) will send the pending alert notification or a newly generated alert notification (both of which are represented by reference numeral 76) to the call center server 44.

While not shown in FIG. 2, it is to be understood that the vehicle 12 (through the application 56, one or more components of the infotainment unit communications module, the vehicle bus 40, and the carrier/communication system 16) may also be programmed to send the pending alert notification or a newly generated alert notification 76 directly to the party 62 (which may be the user's emergency contact) instead of, or in addition to, the call center server 44. When generating the trip plan, the user may designate the party 62 to whom the alert notification 76 is to be sent. The user may also designate the party's communication device, so that a text/

SMS message, email, or call may be placed to the designated party 62. If the designated party 62 is an emergency contact or other emergency personnel, the self-reported tracking system 10 may exclude the call center 14.

It is to be understood that the pending alert notification may be updated prior to its transmission if, for example, position/location data has been received by the vehicle 12 from the mobile communications device 18 during the trip. As mentioned above, the user 74 may have his/her mobile communications device 18 with him/her on the trip. When the mobile communications device 18 is within short range wireless communication with the vehicle 12, the mobile communications device 18 may transmit its position/location (obtained by the unit 34') at a particular time to the infotainment unit 32. The application 56 may be programmed to request any updated mobile communications device position/location data from the memory 54, and may include this data in the alert notification 76.

In an example when the call center server 44 receives the alert notification 76, it may analyze the notification 76 and forward the information to the advisor 60, 60'. The information includes any information that was in the alert notification 76, such as the identity of the vehicle 12 and the user 74, user and/or emergency contact information, trip plan details, position/location information of the user's mobile communications device 18, and/or the like. It is to be understood that the contact information may have been transmitted in the alert notification 76, or the server 44 may have been programmed to retrieve this information from the database 70 using the vehicle identification transmitted with the alert notification 76. It is to be further understood that the position/location data of the mobile communications device 18 may have been transmitted in the alert notification 76. When the position/location data of the mobile communications device 18 is not present in the alert notification 76, the server 44 may be programmed to look for this information in the database 70, because position/location data updates may have been sent from the mobile communications device 18 directly to the call center server 44. The position/location data of the mobile communications device 18 may be the most recent (last received) update, or may include any updates that were received during the duration of the trip plan.

Upon receiving the information, the advisor 60, 60' can attempt to contact the user directly using his/her mobile dialing number. If the user answers, he/she can confirm whether he/she is ok or in need of assistance. If the user answers the call and indicates that he/she is in need of assistance or does not answer the call, the advisor 60, 60' can contact another party 62 (as shown at box 216 in FIG. 2), such as the user's emergency contact and/or emergency personnel. When the automated advisor 60' is utilized, the advisor 60' may provide (through an automated message, a text/SMS message, or an email) the user's emergency contact and/or emergency personnel with a phone number to call or a website to visit to receive more information about the user's potential situation. When the live advisor 60 is utilized, the advisor 60 may provide the user's emergency contact and/or emergency personnel with any or all of the details in the alert notification.

In an example, the live advisor 60 may tell the emergency personnel the user's name and details of the trip plan. If a digital map of the planned route is available, this may be electronically or otherwise transmitted to the emergency personnel. Any position/location updates received by the mobile communications device 18 (even if sporadic) may be used by the advisor 60 or emergency personnel to obtain an idea of where the user 74 might be located. If several position/location updates were received, the time stamps may enable a search area to be narrowed down. Furthermore, the user's mobile number may be used by emergency personnel to estimate the user's location through cell tower triangulation.

Figure 3:
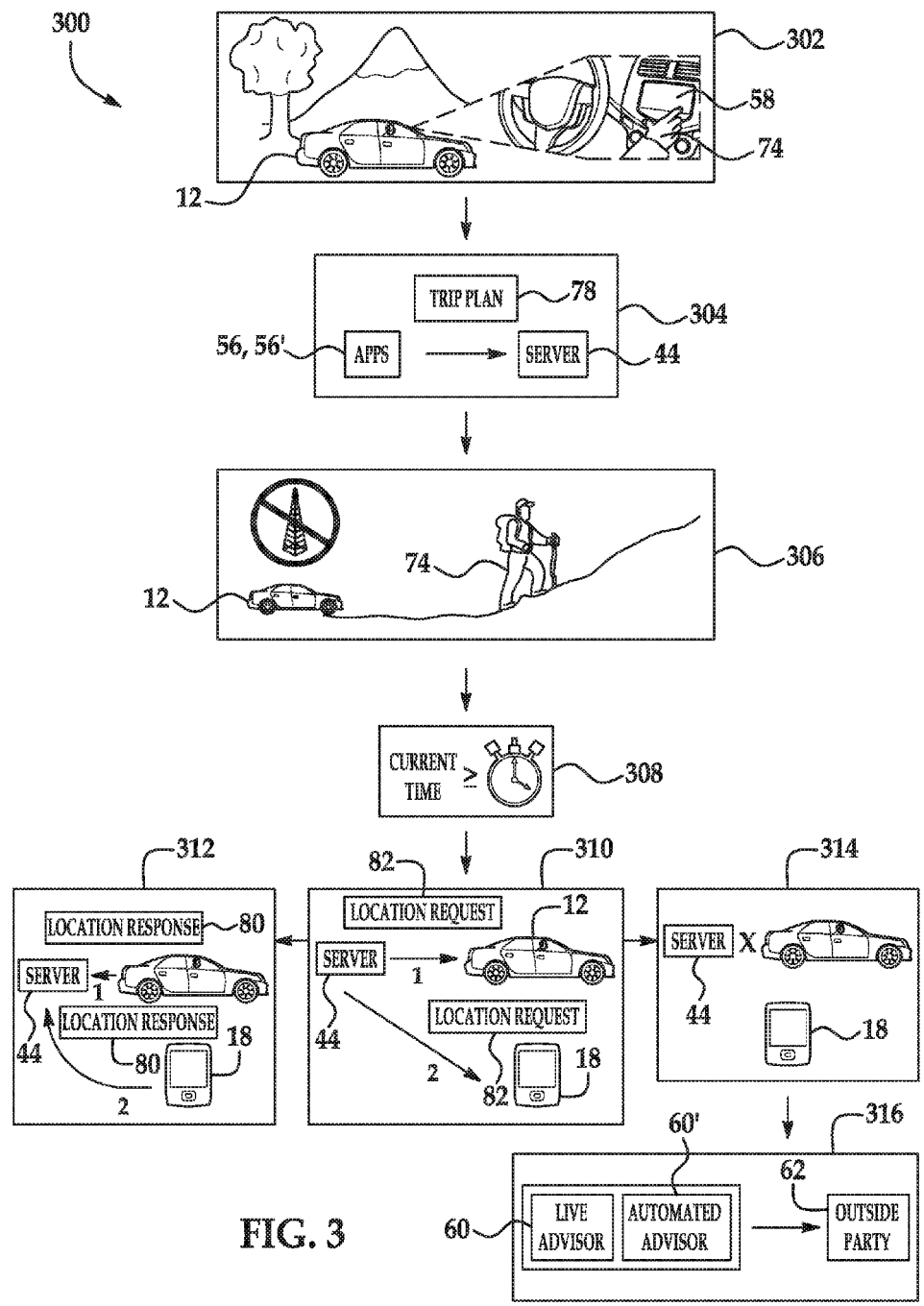
FIG. 3 is a schematic flow diagram illustrating another example of the self-reported tracking method.

Referring now to FIG. 3, the method 300 involves a situation where the starting location of the trip is outside the network coverage for the vehicle 12. In this example then, the call center 14 performs the self-reported tracking method after receiving the trip plan 78 from the vehicle 12 (via application 56 or 56'). This is due to the fact that the vehicle 12 will not be able to contact the call center 14 when parked at the starting location.

In one example, the user 74 may know or suspect that the vehicle 12 will not be able to communicate with the call center 14 when it is parked at the starting location, and thus may enter the trip plan prior to travelling to the starting location. In an example, after the trip plan is created (box 302), the application 56, 56' may display a message asking the user whether he/she would like to save the trip plan in the memory 54 (for the vehicle 12 to perform the monitoring) or transmit the trip plan to the call center server 44 (for the server 44 to perform the monitoring). In this example, the user selects the option for transmitting the trip plan to the call center server 44.

Alternatively, when the user 74 is inputting the trip plan (box 302), the application 56, 56' may be programmed to recognize that the entered starting location is outside of the network coverage or that the vehicle itself 12 is then-currently positioned outside of the network coverage. In an example, the application 56, 56' can access a network coverage map that indicates the strength of signals in geographic areas in order to determine that the starting location is outside of the network coverage area. When the application 56, 56' recognizes that the entered starting location is outside of network coverage, the application 56, 56' may automatically send the trip plan to the call center server 44. In another example, the application 56 can check the actual signal strength of the cellular chipset/component 46 to determine that the vehicle 12 is currently outside of the network coverage. When the application 56 recognizes that the vehicle itself 12 is currently outside of the network coverage, the application 56 may display a message for the user to move the vehicle 12 to within network coverage in order to transmit the trip plan to the call center server 44.

In this example, once the trip plan is complete, the trip plan (designated reference numeral 78 in box 304) is transmitted to the call center server 44.

As shown at box 306, the user 74 then begins his/her trip. The vehicle 12 remains parked at the starting location, which is out of the network coverage area (illustrated by the lack of cell tower).

In this example, the call center server 44 may set an alarm in accordance with the user's expected return time, as set forth in the expected trip duration and/or expected trip return. When the current time and/or date correspond(s) with the trip expiration time and/or date, the alarm will notify the call center server 44 of the trip expiration. This is illustrated in box 308, where the current time CT is at or after (i.e., $\geq$) the expiration of the expected trip duration/return (represented by the clock).

As shown at box 310, the call center server 44 then transmits a location request 82 to the infotainment unit 32 of the vehicle 12 (route 1) or to the micro-processor 52' of the mobile communications device 18 (route 2). The location request 82 may be in the form of a computer-readable message that the infotainment unit processor 52 or micro-processor 52' can process and respond to when the vehicle 12 or mobile communications device 18 is within the network coverage area.

If the vehicle 12 receives or mobile communications device 18 receives the location request 82, the location detection based chipset/component 34 will retrieve the vehicle's current position or the location detection based chipset/component 34' will retrieve the mobile communications device's current position. The processor 52 can incorporate the vehicle's current position into a location response 80, and transmit the location response 80 back to the call center server 44 (route 1 in box 312). Likewise, the processor 52' can incorporate the mobile communications device's current position into a location response 80, and transmit the location response 80 back to the call center server 44 (route 2 in box 312). The location response 80 may be in the form of any computer-readable message. Upon receiving the location response 80, the call center server 44 may be programmed to delete the trip plan and take no further action. Upon receiving the location response 80, the call center server 44 may be programmed to transmit an automated call to the vehicle 12 or mobile communications device 18 requesting the then-current vehicle occupant or mobile communications device user to provide an identifier associated with the user (e.g., a personal identification number, password, etc.) so that the server 44 knows that the user has returned to the vehicle 12 or the mobile communications device 18.

When contacting the mobile communications device 18, it is to be understood that the server 44 may be programmed to make the location request 82 through a phone call or a text/SMS message that inquires if the user back from his/her trip and/or if the user needs assistance.

If the vehicle 12 or the mobile communications device 18 is outside of the network coverage area (e.g., is still parked at the starting location), the vehicle 12 or the mobile communications device 18 will not receive the location request 82 and thus will not respond (or a user will not answer or text back) (illustrated in box 314). In this instance, the call center server 44 recognizes the trip expiration and the fact that the vehicle 12 or the mobile communications device 18 is non-responsive. These circumstances indicate that the user 74 has not returned to the vehicle 12 within the trip plan period, and that the user 74 may be in need of assistance.

In this example, the call center server 44 will generate the alert notification (not shown in FIG. 3), which includes information that is to be transmitted to another party 62 outside of the call center 14 and outside of the vehicle 12. In this example, the information may include the identity of the vehicle 12 and the user 74, user and/or emergency contact information, trip plan details, position/location information of the user's mobile communications device 18, and/or the like. It is to be understood that the contact information may have been transmitted in the trip plan 78, or the server 44 may have been programmed to retrieve this information from the database 70 using the vehicle identification transmitted with the trip plan 78.

It is to be further understood that in this example, the position/location data of the mobile communications device 18 may have been transmitted directly to the call center 14 from the mobile communications device 18 if the user 74 has the device 18 with him on the trip and entered a network coverage area while on the trip. If the mobile communications device 18 could not connect to the network while the user 74 is on the trip, position/location data may not be available. The server 44 may be programmed to look for any position/location data updates in the database 70. The position/location data of the mobile communications device 18 may be the most recent (last received) update, or may include any updates that were received during the duration of the trip plan.

The call center server 44 will forward the alert notification to the advisor 60, 60'. Upon receiving the alert notification, the advisor 60, 60' can attempt to contact the user directly using his/her mobile dialing number. If the user answers, he/she can confirm whether he/she is ok or in need of assistance. If the user answers the call and indicates that he/she is in need of assistance or does not answer the call, the advisor 60, 60' can contact another party 62 (as shown at box 316 in FIG. 3), such as the user's emergency contact and/or emergency personnel. When the automated advisor 60' is utilized, the advisor 60' may provide the user's emergency contact and/or emergency personnel with a phone number to call or website to visit to receive more information about the user's potential situation. When the live advisor 60 is utilized, the advisor 60 may provide the user's emergency contact and/or emergency personnel with any or all of the details in the alert notification.

In an example, the live advisor 60 may tell the emergency personnel the user's name and details of the trip plan. If a digital map of the planned route is available, this may be electronically or otherwise transmitted to the emergency personnel. Any position/location updates received by the mobile communications device 18 (even if sporadic) may be used by the advisor 60 or emergency personnel to obtain an idea of where the user 74 might be located. If several position/location updates were received, the time stamps may enable a search area to be narrowed down. Furthermore, the user's mobile number may be used by emergency personnel to estimate the user's location through cell tower triangulation.

In the examples of the method 200, 300 and system 10 disclosed herein, the user may proactively initiate self-tracking while he/she is participating in a trip/excursion. This may advantageously provide trip plan details and/or other useful information in the event that the user 74 does not return to his/her vehicle at an expected time or on an expected day.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A self-reported tracking method, comprising:
  receiving, at an in-vehicle application resident on a memory of an in-vehicle infotainment unit of a vehicle or an application resident on a memory of a mobile device, a trip plan, the trip plan including an expected trip duration, an expected trip return, or combinations thereof;
  any of monitoring, facilitated by an in-vehicle bus connected to the infotainment unit, the vehicle for a return event, or monitoring, facilitated by a monitoring system of the mobile device, the mobile device for a return event; and any of:
i) receiving a notification at the in-vehicle application that the return event has been recognized; and
  identifying that the return event has occurred prior to or at expiration of the expected trip duration, the expected trip return, or the combinations thereof; or
ii) recognizing, by the in-vehicle application, that the expected trip duration, the expected trip return, or the combinations thereof has expired, and that no notification of the return event has been received; and
  transmitting, from a communications module of the infotainment unit, a pending alert notification to a party outside of the vehicle; or
iii) receiving a notification at the application that the return event has been recognized; and
  identifying that the return event has occurred prior to or at expiration of the expected trip duration, the expected trip return, or the combinations thereof; or
iv) recognizing, by the application, that the expected trip duration, the expected trip return, or the combinations thereof has expired, and that no notification of the return event has been received; and
  transmitting, from the mobile device, a pending alert notification to a party outside of the vehicle.

2. The self-reported tracking method as defined in claim 1 wherein prior to expiration of the expected trip duration, the expected trip return, or the combinations thereof, the method further comprising receiving, at the in-vehicle application, a location update from a mobile communications device in short range wireless communication with the in-vehicle infotainment unit.

3. The self-reported tracking method as defined in claim 2 wherein transmitting the pending alert notification includes transmitting a last received location update from the mobile communications device.

4. The self-reported tracking method as defined in claim 1 wherein the trip plan includes the expected trip duration and a destination and wherein the method further comprises:
  retrieving, by the in-vehicle application or the application, weather information for the destination during the expected trip duration; and
  presenting the weather information on an in-vehicle display or a mobile device display.

5. The self-reported tracking method as defined in claim 4, further comprising providing an option to update the trip plan based upon the weather information.

6. The self-reported tracking method as defined in claim 1 wherein:
  the notification is received at the in-vehicle application;
  the return event is identified as having occurred prior to expiration of the expected trip duration, the expected trip return, or the combinations thereof; and
  the method further comprises cancelling a pending alert notification.

7. The method as defined in claim 1, further comprising generating, by the in-vehicle application, the pending alert notification in response to receiving the trip plan.

8. The method as defined in claim 1 wherein the party outside of the vehicle is an emergency contact identified in the trip plan.

9. The self-reported tracking method as defined in claim 1 wherein prior to expiration of the expected trip duration, the expected trip return, or the combinations thereof, the method further comprising receiving, at a call center server associated with the vehicle, a location update from a mobile communications device in network communication with the call center.

10. The self-reported tracking method as defined in claim 9 wherein:
  expiration of the expected trip duration, the expected trip return, or the combinations thereof is recognized;
  no notification of the return event is received;
  the party outside the vehicle is an advisor of the call center; and
  the method further comprises notifying emergency personnel of the trip plan and a last received location update from the mobile communications device.

11. The method as defined in claim 1, further comprising:
  retrieving an expected route from the trip plan; and
  transmitting the expected route with the pending alert notification to a party outside of the vehicle.

12. A self-reported tracking method, comprising:
  receiving, at a server from an in-vehicle application resident on a memory of an in-vehicle infotainment unit of a vehicle, a trip plan, the trip plan including an expected trip duration, an expected trip return, or combinations thereof;
  after expiration of the expected trip duration, the expected trip return, or the combinations thereof, transmitting a location request to the vehicle or to a mobile communications device associated with the vehicle from the server; and any of:
  i) receiving a response from the vehicle or from the mobile communications device; or
  ii) receiving no response from the vehicle or from the mobile communications device; and
  transmitting an alert notification to a party outside of the vehicle.

13. The self-reported tracking method as defined in claim 12 wherein the trip plan includes the expected trip duration and a destination, and wherein the method further comprises:
  retrieving, by the in-vehicle application, weather information for the destination during the expected trip duration;
  presenting the weather information on an in-vehicle display; and
  providing an option to update the trip plan based upon the weather information.

14. The self-reported tracking method as defined in claim 12, further comprising:
  receiving, at the server, a location update from the vehicle or the mobile communications device after receiving the trip plan and prior to the expiration of the expected trip duration, the expected trip return, or the combinations thereof; and
  wherein the transmitting of the alert notification includes transmitting a last received location update from the vehicle.

15. A self-reported tracking system, comprising:
  a microprocessor;
  a memory associated with the microprocessor;
  a monitoring system connected to the microprocessor, the monitoring system to monitor for a return event; and
  an application resident on the memory, the application including computer readable instructions for:
    receiving a trip plan including an expected trip duration, an expected trip return, or combinations thereof; and
    each of:
    i) receiving a notification from the monitoring system that the return event is recognized; and
      identifying that the return event has occurred prior to expiration of the expected trip duration, the expected trip return, or the combinations thereof; and ii) recognizing that the expected trip duration, the expected trip return, or the combinations thereof has expired, and that no notification of the return event has been received; and initiating transmission of a pending alert notification to a party.

16. The system as defined in claim 15 wherein the microprocessor and memory are part of an infotainment unit in a vehicle, and the system further comprises:

a mobile communications device associated with the vehicle; and a last received location update from the mobile communications device.

17. The system as defined in claim 16, further comprising a call center server running computer readable instructions, embodied on a non-transitory computer readable medium, for:

receiving the alert notification including the last received location update from the mobile communications device; and notifying emergency personnel of the trip plan and the last received location update from the mobile communications device.

18. The system as defined in claim 15, further comprising:

a weather source in communication with the application; and the application further including computer readable instructions for:

receiving, from the weather source, weather information for a destination associated with the trip plan during the expected trip duration;

presenting the weather information on an in-vehicle display or a mobile device display; and providing an option to update the trip plan based upon the weather information.

19. The system as defined in claim 15 wherein the microprocessor and memory are part of a mobile communications device.

* * * * *